Patented Aug. 23, 1949

2,480,089

UNITED STATES PATENT OFFICE 2,480,089

METHOD OF PRODUCING ISOCYANATES

Robert J. Slocombe, Edgar E. Hardy, and James H. Saunders, Anniston, Ala., assignors to Monsanto Chemical Company, St. Louis, Mo., a corporation of Delaware No Drawing. Application March 24, 1948, Serial No. 16,888

15 Claims. (Cl. 260—453)

The present invention relates to isocyanic acid esters and to an improved method of preparing same.

One object of the invention is to provide an economically and commercially feasible method of producing isocyanic acid esters in high yields.

An additional object is to provide a method of making isocyanic acid esters wherein primary amines and phosgene are reacted together in the vapor phase, thus insuring substantially instantaneous and complete reaction and obviating the necessity for using a large excess of phosgene in order to expedite the reaction and prevent the excessive formation of by-products which materially reduce the quality and yield of the desired product.

A further object is to provide a method of producing isocyanic acid esters in which primary amines and phosgene are reacted together in the vapor phase, thereby making possible an efficient proportioning, mixing and contacting of the reactants with the result that the reaction may be effectively controlled and carried out in a continuous manner.

A still further object is to provide a direct method of producing isocyanic esters which involves reacting primary amines with phosgene at a temperature sufficient to yield the corresponding isocyanic ester and hydrogen chloride and then separating the latter from the gaseous reaction product before it has an opportunity to combine with the isocyanate.

Other objects and advantages will be apparent to those skilled in the art as the description of the invention proceeds.

Heretofore isocyanic acid esters have been produced in the liquid phase by reacting phosgene with primary amines or amine hydrochlorides to form the corresponding carbamyl chlorides which are then converted into isocyanates by treatment with a base or by thermal decomposition.

For example, one method which has been employed comprises reacting primary amines with hydrogen chloride to form the corresponding salt, treating this salt while in the molten state with phosgene to produce the carbamyl chloride and then dehydrochlorinating the latter to yield the corresponding isocyanate. As an improvement of the foregoing method, it has been proposed to pass the phosgene over the molten hydrochloride salt at a rate sufficient to remove hydrogen chloride as rapidly as it is formed in the reaction and thereby produce the isocyanate directly.

Another liquid phase method which has been practiced involves preparing the amine salt by adding hydrogen chloride to a solution of the corresponding amine in a suitable organic solvent and then treating the resulting slurry at a temperature of 130° C. to 180° C. with phosgene. The above operations are represented by the following equations:

$$RNH_2 + HCl \rightarrow RNH_3Cl$$
$$RNH_3Cl + COCl_2 \rightarrow RNHCOCl$$
$$RNHCOCl \rightarrow RNCO + HCl$$

To avoid having to separately prepare the hydrochloride salt in the above manner, a modified procedure has been followed which involves adding a solution of the amine to a solution of excess phosgene at 0° C. to 50° C. to bring about the following reaction:

$$2RNH_2 + COCl_2 \rightarrow RNHCOCl + RNH_3Cl$$

This reaction mixture is heated to 130° C. to 180° C. while being treated with further quantities of phosgene which converts the hydrochloride salt into the carbamyl chloride. Above 80° C. the carbamyl chloride decomposes into the corresponding isocyanate and hydrogen chloride and consequently the latter is removed from the reaction mixture by the sweeping action of the excess phosgene. To complete the decomposition and to remove the last traces of hydrogen chloride and dissolved phosgene, the reaction mixture is refluxed and then cooled to separate the isocyanate product.

The above described methods of preparing isocyanates have enjoyed some measure of success, but they have a number of disadvantages which impair or discourage their use on a commercial scale.

One disadvantage of the liquid phase methods is that they involve a multiphase reaction which precludes efficient proportioning, mixing and contacting of the reactants with the result that the reaction rate is very slow and consequently large and expensive equipment is required for large volume production.

Another disadvantage is that the liquid phase methods require the separate preparation of the amine hydrochloride or the recovery of the carbamyl chloride, and also the use of a very large excess of phosgene for complete conversion, all of which operations are costly, time-consuming and unnecessary in the production of isocyanates from primary amines.

Another disadvantage is that the liquid phase solvent methods require vigorous agitation to effect mixing and contacting of the reactants and this further adds to the cost of isocyanate production.

A further disadvantage is that the liquid phase methods are not readily adapted to continuous operation without resorting to specialized equipment and techniques.

Now we have developed a relatively simple, commercially and economically feasible method of directly producing isocyanic acid esters, which has none of the objectionable features mentioned above. This method involves reacting together, in the vapor phase, primary amines and phosgene at a temperature sufficient to yield the corresponding isocyanic acid esters and hydrogen chloride and then separating the former from the reaction product at a temperature avoiding substantial combination of the esters with the above gas to form carbamyl chlorides.

The above separation may be accomplished by physical and/or chemical means, but the most practical method to be used varies with the isocyanic acid ester produced. For example, if the ester boils above the decomposition temperature of the corresponding carbamyl chloride, the separation may be advantageously effected by chemical or physical means such as by condensing or scrubbing the ester from the reaction products. However, if the ester boils in the range of or below the carbamyl chloride decomposition temperature, then chemical methods of separation are the more practical ones to use, but it is to be clearly understood that the invention is not limited thereto as physical methods may also be employed. In either event, it is essential to make the separation at a temperature corresponding to or above the decomposition point of the carbamyl chloride, otherwise this compound or mixtures thereof with isocyanic acid esters will be formed.

For a more complete understanding of the improved vapor phase method of making isocyanic acid esters, reference is made to the following illustrative examples.

EXAMPLE 1

*Phenyl isocyanate*

The apparatus employed in this embodiment of the invention included an aniline vaporizer, phosgene and aniline flow meters, a reactor, a receiver and a reflux condenser.

The reactor consisted of an electrically heated Pyrex glass tube, which was 60 cm. long and had an inside diameter of 16 mm. The reactor was mounted vertically and phosgene was led in through a glass inlet tube which was drawn out to a tip having an inside diameter of 1 mm. The phosgene inlet tube entered the reactor at the bottom and extended about two thirds the way up into the reactor tube. The aniline vapor was introduced directly into the bottom of the reactor tube. A thermometer inserted into the top of the reactor indicated the temperature of the exit gases. Using this system, the aniline did not come into contact with the phosgene until it reached the upper third of the reactor tube and consequently the effective reactor volume, that is, the volume in which phosgene and aniline were mixed and heated, was about 30 c. c.

The exit gases passed out the top of the reactor through a glass tube which was electrically heated to a temperature of 130° C. This tube extended almost to the bottom of a 500 c. c., three-necked, round bottomed flask which contained 250 c. c. of refluxing toluene. The second neck of this flask was closed while the third one led to a bead packed column which was heated externally to maintain a temperature of 110° C. inside the column. Finally, a long condenser was placed on top of the column, which condensed the toluene vapors and returned them to the above flask.

*Description of method*

Aniline vapor and phosgene were charged to the above reactor for a period of twenty minutes at flow rates which were adjusted to supply 1.96 moles of phosgene per mole of aniline. During the reaction, which involved a total consumption of 50 grams of aniline, the reactor tube was heated in such a manner that the exit gases were maintained at a temperature of about 310° C. The sojourn time of the reactants in the reactor was about 0.3 of a second.

The gaseous reaction products thus obtained were conveyed to the flask containing refluxing toluene which extracted the phenyl isocyanate and allowed the gaseous product including hydrogen chloride to pass out of the system. The resulting toluene solution of phenyl isocyanate was then distilled through a Vigreux column to separate the toluene and 56.8 g. of phenyl isocyanate, B. P. 157–162° C., was obtained which represented a product yield of 88.8% of theory, basis aniline.

The condenser system was operated at a temperature above the decomposition point of phenyl carbamyl chloride and hence the product was obtained directly from phosgene and aniline and not by first forming and recovering phenyl carbamyl chloride and then decomposing the latter into phenyl isocyanate.

EXAMPLE 2

*Methyl isocyanate*

The same reactor described in connection with the preparation of phenyl isocyanate was used in this embodiment of the invention. The reactor was connected by means of a glass tube to a 3 liter, three-necked, round bottomed flask, which contained 450 g. of dry pyridine and 250 c. c. of dry toluene. The connecting tube extended practically to the surface of the liquid in the flask, and was insulated and electrically heated to 140° C. to 150° C. One neck of the flask was attached to a Vigreux column on which was placed a helix packed column, a partial take off head, and a condenser which in turn was connected to a Dry Ice-methanol trap. This system was operated in such a manner that the liberated hydrogen chloride was removed from the hot gaseous reaction products in the form of pyridine hydrochloride and as this operation proceeded the distilling toluene and pyridine vapors extracted and carried the separated methyl isocyanate vapors over into the condenser where they were condensed and then collected together as a crude mixture.

*Description of method*

Methyl amine and phosgene were introduced over a period of two hours into the above reactor at rates of 0.59 and 0.7 moles per hour respectively and during the reaction the reactor tube was heated so as to maintain the exit gases at a temperature of 260° C. to 280° C. The gaseous reaction products containing methyl isocyanate and hydrogen chloride were conveyed to the boiling toluene-pyridine solution where the hydrogen chloride was removed by chemical reaction with pyridine. As the reaction proceeded, a mixture of methyl isocyanate, toluene and pyridine, boiling at 60° C. to 80° C. was distilled out of the reaction mixture and at the end of the reaction, the distillation was continued until the distillate boiled at 112° C. The crude distillate thus collected was redistilled through a helix packed column and methyl isocyante, B. P. 37–41° C., in very good yield was obtained.

The various conditions of operation of the present method will now be discussed in detail.

In the production of isocyanic acid esters in accordance with the present invention, the gaseous or vaporized amine and phosgene are reacted together in a phosgene/amine molecular ratio which may vary from 1.2 to 8.0. Larger or smaller ratios are also within the scope of the invention, but when smaller ratios are employed, the theoretical requirements at least should be met.

In preparing phenyl isocyanate, highly satisfactory results are obtained with phosgene/aniline molecular ratios of from 1.4 to 2.8, but within this range a ratio of about 1.96 is preferred since it was found to give the highest product yield. In the production of methyl isocyanate, it is desirable to employ a phosgene/methyl amine molecular ratio of from about 1.2 to 2.5, but the best results from the standpoint of product yield are obtained when using a ratio of about 1.2.

The temperature at which the reaction is carried out may vary widely without departing from the spirit of the invention, but in general a reaction temperature of 240° C. to 400° C., and preferably from 260°–300° C. is employed. Broadly stated, the amine-phosgene reaction may be executed within the range defined by the decomposition temperature of the corresponding carbamyl chloride and that temperature above which substantial decomposition of the isocyanic acid ester takes place.

When reacting aniline with phosgene, the reactor is preferably operated in such a manner as to maintain the exit gases at a temperature of about 310° C., it being understood, of course, that this temperature will vary somewhat depending upon the size and construction of the reactor. In reacting methyl amine with phosgene, the reactor is preferably heated to a temperature sufficient to maintain the exit gases at a temperature of about 260° C. to 280° C.

In the reaction of other amines with phosgene, the optimum reaction temperature varies with each amine and in view of the numerous amines contemplated by the instant invention, no attempt will be made to specify these temperatures.

The optimum sojourn time of the reactants in the reactor also varies with the amine being treated. In producing phenyl or methyl isocyanate, it is desirable to control the flow rates of phosgene and the amine so that the sojourn time falls within the range of about 0.24 to about 2.5 seconds, but it is to be clearly understood that the invention is not in any sense restricted thereto as higher or lower sojourn times may be used as desired. The preferred sojourn times for the reactants in the production of the above isocyanates are 0.3 of a second and 1.2 seconds respectively.

As indicated earlier herein, the phosgene-amine reaction is executed at a temperature corresponding to or above the decomposition point of the corresponding carbamyl chloride but below that temperature at which substantial decomposition of the isocyanate takes place. The product of this reaction is a gaseous or vaporous mixture containing the isocyanic acid ester and hydrogen chloride and as these materials readily react together at temperatures below the range of 60–100° C. to yield the carbamyl chloride, it is essential that they be separated from each other at a temperature at which substantial combination is avoided.

The isocyanic acid esters containing from 1 to 5 carbon atoms per molecule boil in the range of or below the carbamyl chloride decomposition temperature and may be separated from hydrogen chloride by scrubbing with an inert organic solvent for the ester, such as chlorobenzene, xylene, toluene, ortho-dichlorobenzene, 1,2,4-trichlorobenzene, kerosene, cyclohexane, carbon tetrachloride, hexahydrobenzene, ligroin, petroleum ether, etc. The separation of the above esters may also be effected by adsorbing the hydrogen chloride in an adsorbent or by any of the well known methods for physically separating the above gas from gaseous products containing same. It is preferred, however, to achieve the above result by chemical means in the manner hereinafter indicated.

The isocyanic acid esters containing at least 6 carbon atoms per molecule boil above the decomposition temperature of the corresponding carbamyl chlorides and may be readily separated by condensing and/or scrubbing the esters from the reaction product, but other well known physical methods of the type mentioned above are also within the scope of the invention.

The temperature at which the isocyanic acid esters may be condensed from the gaseous reaction products without substantial contamination of the product with carbamyl chloride varies with the isocyanic acid ester produced and in view of the large number of esters contemplated by the instant invention, no attempt will be made, except in the case of phenyl isocyanate, to designate these temperatures more specifically as they may be determined from the carbamyl chloride decomposition temperatures which are either available in the literature or may be experimentally determined by one skilled in the art.

With respect to phenyl isocyanate, this product may be separated by condensing it from the gaseous reaction product in a dry condenser at a temperature above 125° C. and in a wet condenser at a temperature above 105° C.

The separation of the gaseous products of the present invention may also be effected by chemical means and for this purpose any material is suitable which will react with hydrogen chloride and not with the isocyanic acid ester. Calcium oxide and tertiary amines such as pyridine, dimethyl aniline, etc., are illustrative examples of such materials, but it is, of course, understood that the invention is not restricted thereto. Except for the above noted limitation, the chemical method of separation is applicable to all isocyanic acid ester-hydrogen chloride mixtures.

While the description of the invention has been limited to carrying out the reaction in one zone and effecting the separation in a separate zone, it is also within the scope of the invention to perform both functions in the same zone. For example, this can be done by introducing the reactants into a reaction zone containing chemical or physical adsorbents for hydrogen chloride and then separating the resulting isocyanic acid ester by condensation, scrubbing or other suitable physical means.

The amines suitable for use as raw materials in the practice of the present invention comprise a wide variety of primary amines having either cyclic or acyclic structure. These amines may be aromatic, aliphatic, alicyclic, or heterocyclic or may contain mixed radicals of the above types, the only limitation being that they must not substantially decompose or polymerize when vaporized.

The above description and examples are intended to be illustrative only. Any modification or variation therefrom which conforms to the spirit of the invention is intended to be included within the scope of the claims.

This application is a continuation-in-part of application Serial No. 601,372, filed June 25, 1945, in the name of Robert J. Slocombe and Edgar E. Hardy.

What we claim is:

1. The method which comprises reacting together, in the vapor phase, a primary amine and phosgene at a temperature within the range defined by the decomposition point of the corresponding carbamyl chloride and that temperature above which substantial decomposition of the isocyanate occurs and separating the resulting hydrogen chloride from the vaporous reaction product while the latter is maintained at a temperature within the above range.

2. The method which comprises reacting together, in the vapor phase, a primary amine and phosgene at a temperature above the decomposition point of the corresponding carbamyl chloride but below that temperature at which substantial decomposition of the isocyanate occurs and separating the resulting hydrogen chloride from the vaporous reaction product while the latter is maintained at a temperature within the above range.

3. The method which comprises reacting together, in the vapor phase, a primary amine and phosgene at a temperature above the decomposition point of the corresponding carbamyl chloride but below that temperature at which substantial decomposition of the isocyanate occurs and separating the resulting isocyanic acid ester from the vaporous reaction product while the latter is maintained at a temperature within the above range, said reactants being employed in substantially the theoretical proportions required to produce the corresponding isocyanate.

4. The method which comprises reacting together, in the vapor phase, a primary amine and phosgene at a temperature above the decomposition point of the corresponding carbamyl chloride but below that temperature at which substantial decomposition of the isocyanate occurs and then separating the resulting isocyanic acid ester from the vaporous reaction product while the latter is maintained at a temperature within the above temperature range, said reactants being employed in a phosgene/amine molecular ratio varying from about 1.0 to about 8.0.

5. The method which comprises reacting together, in the vapor phase, a primary amine and phosgene at a temperature above the decomposition point of the carbamyl chloride but below that temperature at which substantial decomposition of the isocyanate occurs and then separating the resulting isocyanic acid ester from the vaporous reaction product while the latter is maintained at a temperature within the above range, said reactants being employed in a phosgene/amine molecular ratio of from 1.4:1 to 2.8:1.

6. The method which comprises reacting together, in the vapor phase, a primary amine and phosgene at a temperature within the range of 240° C. to 400° C. to form a vaporous product containing the corresponding isocyanic acid ester and hydrogen chloride and then separating said ester from said product at a temperature avoiding substantial combination of said ester with said hydrogen chloride, said reactants being employed in a phosgene/amine ratio of at least 1 to 1.

7. The method which comprises reacting together, in the vapor phase, a primary amine and phosgene at a temperature of 260° C. to 270° C. to form a vaporous product containing the corresponding isocyanic acid ester and hydrogen chloride and then separating said ester from said product at a temperature avoiding substantial combination of said ester with said hydrogen chloride, said reactants being employed in a phosgene/amine molecular ratio of at least 1 to 1.

8. The method which comprises reacting, in the vapor phase, phosgene and a primary amine containing at least 6 carbon atoms to form a vaporous product containing the corresponding isocyanic acid ester and hydrogen chloride and then separating said ester by condensing same from said product at a temperature above that at which substantial combination with said hydrogen chloride occurs, said phosgene-amine reaction being carried out at a temperature above the decomposition point of the carbamyl chloride but below that temperature at which substantial decomposition of the isocyanic acid ester takes place.

9. The method which comprises reacting, in the vapor phase, phosgene and aniline to form a vaporous product containing phenyl isocyanate and hydrogen chloride and then separating said phenyl isocyanate by condensing same from said product at a temperature above that at which substantial combination with said hydrogen chloride occurs, said phosgene-aniline reaction being carried out at a temperature above the decomposition point of phenyl carbamyl chloride but below that temperature at which substantial decomposition of said phenyl isocyanate takes place.

10. The method which comprises reacting, in the vapor phase, phosgene and aniline to form a vaporous product containing phenyl isocyanate and hydrogen chloride and then separating said isocyanate by condensing same from said product at a temperature above 125° C., said reaction being carried out at a temperature above the decomposition point of phenyl carbamyl chloride but below that temperature at which substantial decomposition of said isocyanate takes place.

11. The method which comprises reacting, in the vapor phase, phosgene and aniline to form a vaporous product containing phenyl isocyanate and hydrogen chloride and scrubbing said isocyanate from said product by means of an inert organic solvent maintained at a temperature above 105° C., said reaction being carried out at a temperature above the decomposition point of phenyl carbamyl chloride but below that temperature at which substantial decomposition of said isocyanate takes place.

12. The method which comprises reacting, in the vapor phase, phosgene and a primary amine containing from 1 to 5 carbon atoms to form a vaporous product containing the corresponding isocyanic acid ester and hydrogen chloride and separating said hydrogen chloride from said product at a temperathre above that at which substantial combination of said ester with said hydrogen chloride occurs, said phosgene-amine reaction being carried out at a temperature above the decomposition point of the carbamyl chloride but below that temperature at which substantial decomposition of the isocyanate takes place.

13. The method which comprises reacting, in the vapor phase, phosgene and methyl amine to form a vaporous product containing methyl isocyanate and hydrogen chloride and separating said hydrogen chloride from said product by chemical absorption at a temperature above that at which substantial combination of said isocyanate with said hydrogen chloride occurs, said phosgene-amine reaction being carried out at a temperature above the decomposition point of methyl carbamyl chloride but below that temperature at which substantial decomposition of said isocyanate takes place.

14. The method which comprises reacting, in the vapor phase, phosgene and methyl amine to form a vaporous product containing methyl isocyanate and hydrogen chloride and separating said hydrogen chloride from said product by chemical reaction with a tertiary amine at a temperature above that at which substantial combination of said isocyanate with said hydrogen chloride occurs, said phosgene-amine reaction being carried out at a temperature above the decomposition point of methyl carbamyl chloride but below that temperature at which substantial decomposition of said isocyanate takes place.

15. The method defined in claim 14, wherein pyridine is the tertiary amine employed.

ROBERT J. SLOCOMBE.
EDGAR E. HARDY.
JAMES H. SAUNDERS.

REFERENCES CITED

The following references are of record in the file of this patent:

UNITED STATES PATENTS

| Number | Name | Date |
|---|---|---|
| 405,992 | Rinke et al. | Apr. 20, 1943 |
| 2,319,057 | Hanford | May 11, 1943 |
| 2,346,202 | Waltmann et al. | Apr. 11, 1944 |
| 2,362,648 | Lichty et al. | Nov. 14, 1944 |
| 2,394,597 | Dickey et al. | Feb. 12, 1946 |
| 2,409,712 | Schweitzer | Oct. 22, 1946 |